(12) United States Patent
Sigg et al.

(10) Patent No.: US 8,010,117 B1
(45) Date of Patent: Aug. 30, 2011

(54) METHOD AND SYSTEM FOR DYNAMICALLY MERGING WIRELESS SERVICE SECTORS

(75) Inventors: Jason P. Sigg, Olathe, KS (US); Ashish Bhan, Shawnee, KS (US); Ajay Manghat, Overland Park, KS (US); Swaminathan Balakrishnan, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1220 days.

(21) Appl. No.: 11/679,700

(22) Filed: Feb. 27, 2007

(51) Int. Cl.
*H04W 40/00* (2009.01)
*H04W 36/00* (2009.01)
*H04W 72/00* (2009.01)
*H04W 4/00* (2009.01)
*H04M 1/00* (2006.01)

(52) U.S. Cl. ........ 455/446; 455/443; 455/453; 455/561; 455/562.1; 370/331; 370/332; 370/333

(58) Field of Classification Search .................. 455/418, 455/445, 446, 436, 442–433, 453, 561, 562.1
See application file for complete search history.

(56) References Cited

U.S. PATENT DOCUMENTS

| | | | | |
|---|---|---|---|---|
| 6,122,266 | A * | 9/2000 | Lynch | 370/335 |
| 6,778,833 | B1 * | 8/2004 | Fortuna | 455/446 |
| 7,327,707 | B2 * | 2/2008 | Qi et al. | 370/331 |
| 7,411,899 | B2 * | 8/2008 | Kavak et al. | 370/209 |
| 7,471,950 | B1 * | 12/2008 | Oh et al. | 455/436 |
| 2006/0291371 | A1 * | 12/2006 | Sutivong et al. | 370/208 |
| 2007/0129071 | A1 * | 6/2007 | Shapira | 455/422.1 |
| 2009/0129334 | A1 * | 5/2009 | Ma et al. | 370/331 |
| 2009/0274196 | A1 * | 11/2009 | Black et al. | 375/147 |

OTHER PUBLICATIONS

"Smart Antennas—A Technical Introduction" Symena Software and Consulting GmbH, Vienna, Austria (www.symena.com), printed from the World Wide Web on Feb. 27, 2007, pp. 1-5.
"Smart Antenna Systems" International Engineering Consortium (www.iec.ort/online/tutorials/smart_ant/), printed from the World Wide Web on Feb. 27, 2007, pp. 1-29.

* cited by examiner

*Primary Examiner* — Patrick N Edouard
*Assistant Examiner* — Huy C Ho

(57) ABSTRACT

A method and system is disclosed for dynamically merging wireless service sectors in a wireless communication system. The method and system determines when certain conditions exist under which dynamically merging a plurality of wireless service sectors would advantageously yield an increased data rate for transmissions to access terminals (ATs) operating the plurality, while, at the same time, not resulting in a total traffic load that would be detrimental to system performance. The method and system also incorporate the manner and means of merging sectors so as to cause the plurality of wireless service sectors to operate as a single, dynamically-merged wireless service sector. Each access terminal operating in a dynamically-merged wireless service sector receives the full, combined power of all the sectors of the plurality during transmissions to that AT.

26 Claims, 6 Drawing Sheets

METHOD AND SYSTEM FOR DYNAMICALLY MERGING WIRELESS SERVICE SECTORS

FIELD OF THE INVENTION

The present invention relates to wireless communications and, more particularly, to dynamically merging sectors of a wireless communication system.

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When a mobile station (such as a cellular telephone, pager, or appropriately equipped portable computer, for instance) is positioned in a cell, the mobile station (or MS) communicates via an RF air interface with the BTS antenna of the cell. Consequently, a communication path is established between the mobile station and the transport network, via the air interface, the BTS, the BSC and the switch or gateway.

With the explosive growth in demand for wireless communications, the level of call traffic in most cell sites has increased dramatically over recent years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instant, a mobile station in a wireless network will typically be positioned in a given physical sector and will be able to communicate with the transport network via the BTS serving that physical sector. Because wireless communication with the BTS forms the basis of services offered by the operator (or owner) of the cellular radio communication system, physical sectors are also referred to as "wireless service sectors." Both cells and sectors may be considered more generally as examples of wireless coverage zones, because they correspond to physical regions within which mobile stations may acquire RF links for access to the network.

As a mobile station moves between coverage zones, such as wireless service sectors of a wireless communication system, or when network conditions change or for other reasons, the mobile station may "hand off" from operating in one coverage zone to operating in another coverage zone. In a usual case, this handoff process is triggered by the mobile station monitoring the signal strength of various nearby available coverage zones, and the mobile station or the BSC (or other controlling network entity) determining when one or more threshold criteria are met. For instance, the mobile station may continuously monitor signal strength from various available coverage zones and notify the BSC when a given coverage zone has a signal strength that is sufficiently higher than the coverage zone in which the mobile station is currently operating. The BSC may then direct the mobile station to hand off to that other coverage zone. Without loss of generality with respect to the present invention, coverage zones will, for purposes of illustration, hereafter be considered to be wireless service sectors.

In some instances, the signal strengths of two or more sectors measured by a mobile station may each be within a particular threshold of a common reference level. For instance, the threshold could be 2 dB and reference level could be taken to be the strongest among the measured signals (in which case the strongest signal is, by definition, within any threshold of the reference level). Alternatively, a different reference level could be set by the BSC for each sector. Sectors determined to be within the threshold may then comprise a group, any or all of which could provide an air interface to the mobile station. Such a group is typically referred to as the mobile station's "active set," and may be used to introduce a degree of efficiency into the handoff process, as well as to help the network construct a panoramic view of traffic load. As the mobile station continually monitors the signal strength of sectors, it may correspondingly update its active set as some sectors drop below and others rise above the threshold.

Some air interface communication protocols support sending the same transmission to a mobile station concurrently from two or more of the sectors in the mobile station's active set. Handoff under such a protocol may incorporate a certain seamlessness, as the mobile station can receive concurrent transmissions from multiple sectors as a matter of operation. Exemplary protocols of this type include one or another version of legacy CDMA, such as EIA/TIA/IS-2000 Rel. 0, A (hereafter "IS-2000"). Other air interface protocols specify communicating with a mobile station by transmitting at any one time from only one of the sectors in the mobile station's active set. An exemplary protocol of this type is EIA/TIA/IS-856 Rel. 0, A, or other version thereof (hereafter "IS-856").

In some wireless communication systems or markets, both types of protocol may be implemented. Mobile stations operating in such systems may be capable of communication with either or both protocols, and may further be capable of handing off between them.

SUMMARY

Under IS-856 (or similar protocols), the bandwidth of a sector is shared among multiple mobile stations on a time-division multiplexed basis, whereby each mobile station receives the full power of the sector during its time-based share of the bandwidth. Thus, while a given mobile station may receive transmissions from only one sector at a time, the full power of the one sector supports a higher data rate than the code-based sharing of CDMA, in which each mobile station concurrently receives just a portion of the power of each of multiple sectors. Nevertheless, under certain circumstances it would be desirable for a mobile station to be able to receive time-division multiplexed transmissions concurrently from more than one sector. For instance, a mobile station may be situated such that either of two or more sectors would be (nearly) equally good choices for transmitting to the mobile station. Yet, under IS-856 (or similar protocols), only one will transmit to the mobile station. The present invention leverages the similarity of signal strengths of two or more sectors that may be measured by mobiles stations in particular regions, advantageously combining those sectors so that they may concurrently transmit to the mobile stations operating therein.

Accordingly, the present invention is directed to a method and system for dynamically merging a plurality of wireless service sectors that are under the control of a common network entity. More particularly, a method and system is disclosed for determining when certain conditions exist in a wireless communication system under which dynamically merging a plurality of wireless service sectors would advantageously yield an increased data rate for transmissions to access terminals (ATs) operating in the plurality, while, at the same time, not resulting in a total traffic load that would be detrimental to system performance. The method and system also incorporates the manner and means of merging sectors so as to cause the plurality of wireless service sectors to operate as a single, dynamically-merged wireless service sector. Each access terminal operating in a dynamically-merged wireless service sector receives the full, combined power of all the sectors of the plurality during transmissions to that AT.

Hence, in one respect, the invention is directed to a method, carried out by a network entity controlling a plurality of wireless service sectors, for (i) making a first determination that the signal strength of each of a plurality of wireless service sectors is within a threshold level of signal strength, (ii) making a second determination that the combined traffic load of the plurality is within a reference level of traffic load, and (iii) responsive to at least the first and second determinations, dynamically merging the plurality of wireless service sectors. The network entity could be a base transceiver station (BTS), base station controller (BSC), radio network controller (RNC), or a mobile switching center (MSC); other types of entities are possible as well.

One or more ATs may be operating in at least one of the sectors, and in making the first determination, the network entity will preferably receive from each of the one or more ATs a set of measured signal strengths for each of the sectors of the plurality. For each set, the network entity may then determine that at least one of the measured signal strengths is within a threshold of a reference level for the respective set. Further, the signal strengths may correspond to pilot signal strengths from each sector, and the reference level may be taken to be the strongest pilot signal strength of the set. Still further, each AT may have an active set, and at least one of the plurality of sectors may be a member of each active set.

In making the second determination, the network entity will preferably determine a sub-total number of ATs operating in a signal-overlap area of the plurality of sectors, wherein a signal-overlap area is a region within which an AT measures the signal strength of each sector to be within a threshold of the strongest signal. The network entity will also determine the total number of ATs operating in at least one of the sectors. The second determination then corresponds to the condition that the total number is less than some pre-defined number, and that the ratio of the sub-total number to the total number is greater than a pre-defined threshold.

In accordance with a preferred embodiment, each of the threshold numbers and values can be set by an operator of the wireless communication system, for example, to optimize performance. Further, each sector of the plurality may have a pseudo-random number (PN) offset, and in dynamically merging the sectors, the network entity will preferably assign the same PN offset to each sector of the plurality. Still further, any one of the plurality of sectors may already comprise a merged sector.

Once sectors are merged, the network entity may also take actions to un-merge one or more sectors from the merged wireless service sector. A method of un-merging sectors may comprise determining that the signal strength of at least one of the sectors of the plurality is not within the threshold of the reference level of signal strength, and responsively un-merging one or more of the sectors. Alternatively and/or additionally, a difference between maximum and minimum signal strength of a given AT may be determined from signal received at each of the sectors of the plurality. The average of the differences from each AT may then be computed and compared with a threshold. If the average difference exceeds the threshold, then at least one of the sectors may be un-merged from the merged sector. Further, one or more sectors may be un-merged from the merged sector if and when the total combined traffic load of the plurality of sectors exceeds the reference level of traffic load.

In further accordance with the preferred embodiment, at least two of the sectors of the plurality may correspond to radiation patterns emanating from a single BTS. Still further, at least two of the sectors may correspond to radiation patterns emanating from a two different BTSs.

In another respect, the invention is directed to a method, carried out by a network entity controlling a plurality of wireless service sectors, wherein each wireless service sector defines an air interface channel according to an air interface protocol for communicating with access terminals. In particular, the method comprises (i) making a first determination that a number of ATs operating in a signal-overlap area of the plurality of wireless service sectors is within a first threshold of a first reference number, (ii) making a second determination that a total number of ATs operating in at least one of the plurality of wireless service sectors is within a second threshold of a second reference number and (iii) responsive to at least the first and second determinations, the network entity dynamically merging the plurality of wireless service sectors so as to combine their defined air interfaces for communicating with at least the ATs operating in the signal-overlap area.

In accordance with a preferred embodiment, each air interface channel comprises a forward link for transmitting to ATs in the associated sector, wherein each forward link has a forward-link transmission power. Further, dynamically merging the plurality of wireless services sectors comprises transmitting on all forward links concurrently to the each respective AT, thereby combining all the forward-link transmission power to the AT. Additionally, each AT may request a forward-link data rate based on the combine pilot signal strengths of the plurality of sectors.

As a further aspect, the air interface protocol may be IS-856, and the request by any given AT for a forward-link data rate may be in the form of a Data Rate Control message sent by the AT. As described above, dynamically merging the plurality of sectors may further comprise assigning each sector a single PN offset.

In still another respect, the invention is directed to wireless communication system comprising one or more BTSs radiating to define a plurality of wireless service sectors, each wireless service sector defining an air interface according to an air interface protocol for communicating with access terminals. In operation, each wireless service sector has a pilot signal emitted by an associated BTS. The system also comprises a network entity arranged to control real-time operation of the plurality of wireless service sectors. In particular, the network entity is arranged to receive from each of AT a set of measured pilot signal strengths, wherein each set comprises at least one measurement of pilot signal strength respectively for each wireless service sector of the plurality. The network entity is further arranged to determine a sub-total number of ATs for which in the corresponding, respective set, the at least one measured pilot signal strength for each respective wireless sector of the plurality is within a threshold of a strongest pilot signal strength in the set, and to determine a total number of ATs operating in at least one of the wireless service sectors of the plurality. Then, responsive to at least the sub-total number being within a first threshold of a first reference number and the total number being within a second threshold of a second reference number, the network entity may dynamically merge the plurality of wireless service sectors. As described above, merging causes the sectors to operate collectively as a single, dynamically-merged wireless service sector.

As described above, each air interface preferably comprises a forward link for transmitting to ATs, each forward link having a forward-link transmission power. In dynamically merging the sectors, the network entity, which could be a BTS, BSC, RNC or MSC, among other possibilities, cause the plurality to transmit concurrently to each AT. That is, all the forward-link transmission powers are combined on each transmission to each AT. Again, a further aspect merging sectors is the assignment to each by the network entity of the same PN offset.

In accordance with a preferred embodiment, the network entity may receive from each AT a request for a forward-link data rate, wherein the request is based on the combined pilot signal strengths of the plurality of sectors, as measured by the respective AT. Further, the air interface protocol of the system may be IS-856, in which case the request for a forward-link data rate may be in the form of a DRC message from the respective AT.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to IS-856 communications. However, exemplary operation of communications under IS-2000 is also initially described, as it is relevant to various aspects of the embodiments described. It should be understood, however, that the invention can extend to apply in other arrangements as well. In keeping with the terminology of IS-856, the term "access terminal" or AT is used interchangeably with mobile station (or MS) herein to refer generally to wireless communication devices. An AT may also be a device or component that attaches to a computer (e.g., a laptop), thereby enabling the computer to engage in communications via the wireless communication system.

1. CELLULAR WIRELESS PACKET DATA COMMUNICATIONS

Figure 1:
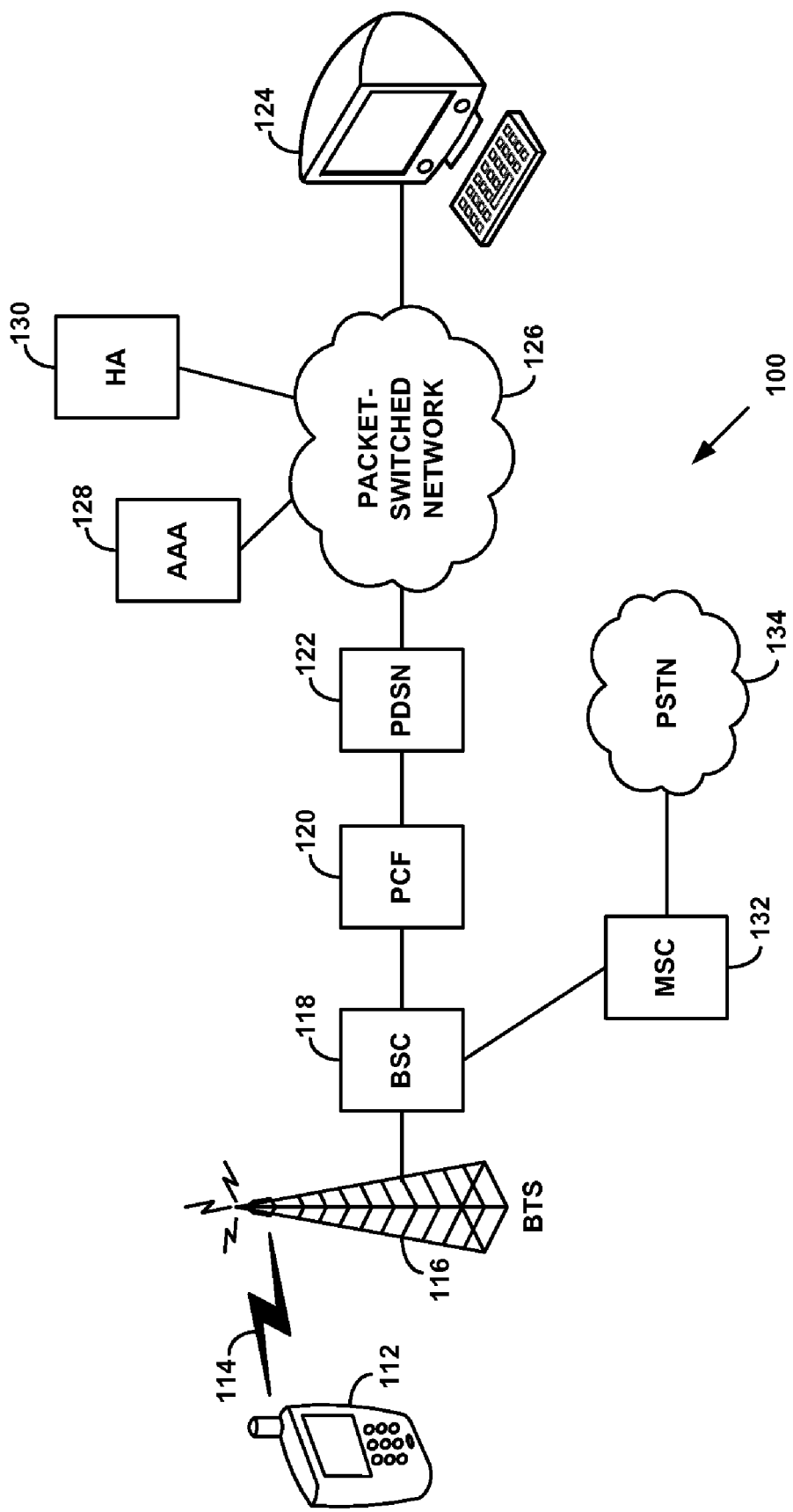
FIG. 1 is a simplified block diagram of a wireless communication system in which an exemplary embodiment of the invention can be employed.

FIG. 1 illustrates an exemplary cellular wireless communication system 100, the depiction emphasizing primarily aspects adapted to provide wireless packet data communication service for an access terminal 112. AT 112 communicates over an air interface 114 with a BTS 116, which is then coupled or integrated with a BSC 118. BSC 118 is then coupled with a PDSN 122, by way of packet control function (PFC) 120. PDSN 122 in turn provides connectivity with a packet-switched network 126 such as the Internet and/or a wireless carrier's private core packet-network. Sitting as nodes on network 126 are, by way of example, a remote computer 124, an authentication, authorization, and accounting (AAA) server 128, and a mobile-IP home agent (HA) 130.

As illustrated, BSC 118 is also connected to MSC 132, which then provides access to circuit-switched services, as represented by the connection between the MSC and PSTN 134 in the figure. The MSC may also act to control assignment of air traffic channels for communication with an access terminal, as explained further below. Note that MSC 132 could also be connected to one or more other MSCs or other telephony circuit switches in the operator's network, in order to support user mobility across MSC regions or landline long-distance telephone services, for instance.

It should be understood that the depiction of just one of each element in FIG. 1 is illustrative, and there could be more than one of any of them, as well as other types of element not shown. The particular arrangement shown in FIG. 1 should not be viewed as limiting with respect to the present invention.

Without loss of generality in connection with the present invention, operation of wireless communication system 100 may be considered with respect packet-data services. Following authentication by AAA server 128, AT 112 may be assigned an IP address by HA 130. With a communication path comprising air interface 114, BTS 116, BSC 118, PCF 120, PDSN 122, and network 126, AT 112 may then engage in packet-data communications with entities such as remote computer 24.

Figure 2:
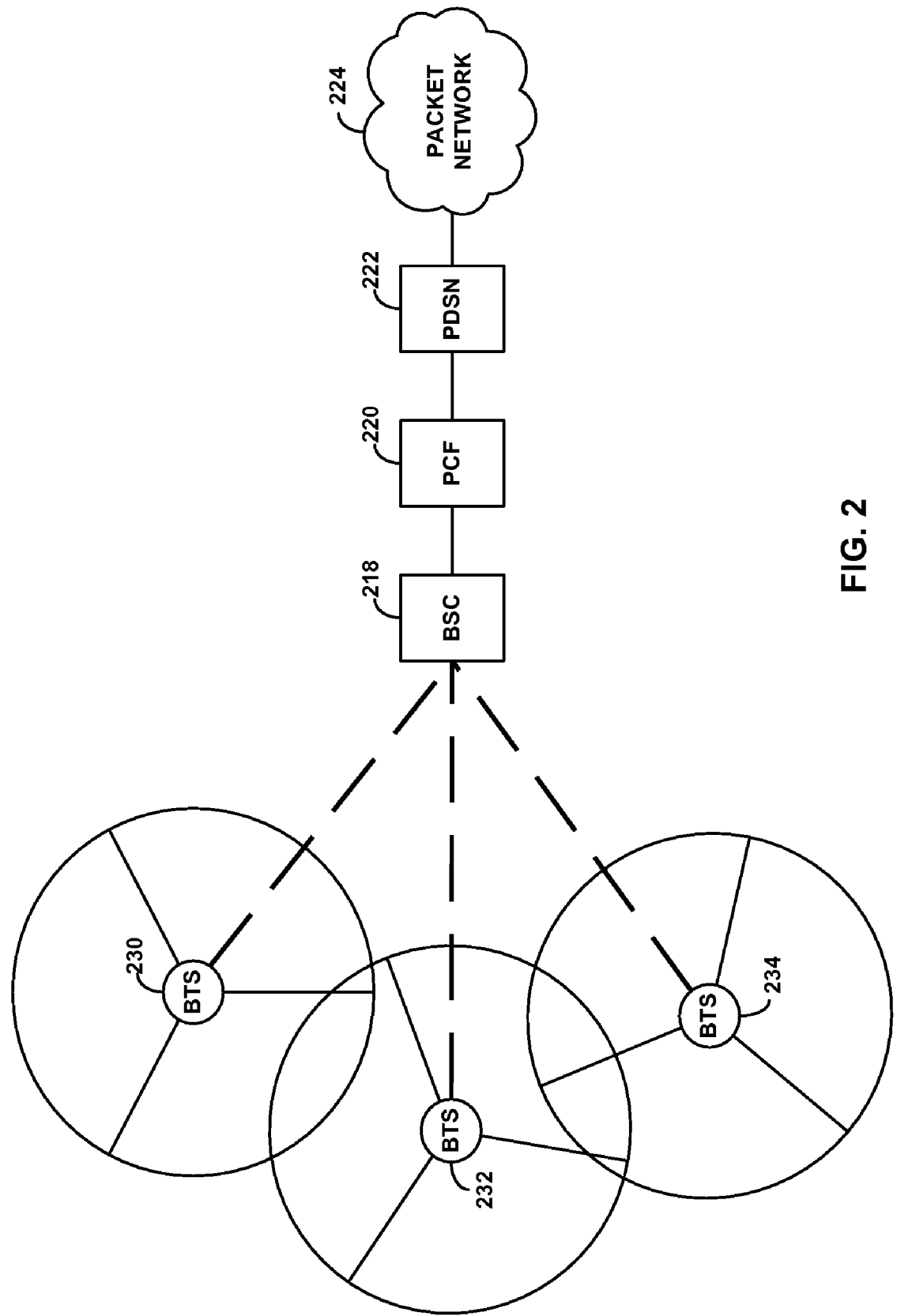
FIG. 2 is another simplified block diagram of a wireless communication system in which the exemplary embodiment can be employed.

In practice, BSC 118 may serve multiple BTSs, each of which may then radiate to define a given cell and a plurality of cell sectors (wireless service sectors). FIG. 2 illustrates this arrangement. As shown in FIG. 2, BSC 218 is coupled with three BTSs 230, 232, and 234. Each BTS is shown at the core of a respective circle representing a cell, and each cell is divided into three pie-pieces representing wireless service sectors. With this arrangement, an access terminal can operate in any of the sectors and can communicate on packet network 224 via its serving BTS, and via BSC 218, PCF 220 and PDSN 222. Note that the depiction of three wireless services sectors for each of the BTSs in FIG. 2 is exemplary, and other numbers of sectors per BTS are possible. Further, the relative positions of the BTSs and the relative angular orientations of the wireless service sectors are also illustrative, and other arrangements may be used.

Throughout this description, the term "base station" will refer to a radio access network element such as a BTS, a BSC, or combination BTS/BSC, for instance. The term "radio network controller" (RNC) may also be used to refer to a BSC, or more generally to a base station, usually in the context of IS-856 communications. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

2. LEGACY CDMA COMMUNICATIONS

In a conventional or "legacy" Code Division Multiple Access ("CDMA") wireless network compliant with the well known IS-2000 standard, each cell employs one or more carrier frequencies, typically 1.25 MHz each, and each wireless service sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being service, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given wireless service sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

With this arrangement, an access terminal can be arranged to engage in packet-data communications. Referring again to FIG. 1, the access terminal first sends a packet-data origination request over the access channel and via the BTS 116 and BSC 118 to MSC 132. The MSC then signals back to the BSC directing the BSC to assign an air interface traffic channel for use by the access terminal, and the BSC signals to the PDSN 122 by way of PCF 120. The PDSN 122 and access terminal 112 then negotiate to establish a data link layer connection, such as a point to point protocol (PPP) session. Further, the PDSN 122 sends a foreign agent advertisement that includes a challenge value to the access terminal, and the access terminal responds with a mobile-IP registration request (MIP RRQ), including a response to the challenge, which the PDSN forwards to HA 120. The HA then assigns an IP address for the access terminal to use, and the PDSN passes that IP address via the BSC to the access terminal.

Once the access terminal has a radio link (an assigned traffic channel), a data link, and an IP address, the access terminal is considered to be in an "active" mode. To conserve air interface resources, however, an IS-2000 system is typically arranged to release the access terminal's assigned traffic channel after a certain amount of time during which no data traffic passes to or from the access terminal through the PDSN. Upon release of the access terminal's radio link, the access terminal is considered to be in a "dormant" mode, in which it lacks a radio link but still has a data link and an IP address.

While in the dormant mode, if the access terminal seeks to transmit packet-data from its IP address, the access terminal would re-acquire a radio link by sending a new origination request message to the BSC. Similarly, if the PDSN receives packet-data destined for the IP address of a dormant access terminal, the PDSN would notify the BSC, the BSC would page the access terminal to cause the access terminal to then re-acquire a radio link, and the PDSN would then pass the data along to the access terminal.

Under IS-2000, an access terminal can communicate with a number of "active" wireless service sectors at a time. (The term "active" in this context should not be confused with the same term used to describe data communication state as noted above.) Depending on the system, the number of active sectors can be up to three or six (currently). The access terminal receives largely the same signal from each of the active sectors and, on a frame-by-frame basis, selects the best signal to use. An access terminal maintains in its memory a list of the active wireless service sectors, identified according to their PN offsets. This list comprises the AT's active set, introduced above.

Operationally, an IS-2000 system is typically arranged to transmit the same data concurrently in some or all of the wireless service sectors in a given AT's active set, encoding each transmission according to the PN offset of the respective sector and the Walsh code for the assigned channel therein. Correspondingly, the AT recognizes the concurrent transmissions according to the PN offsets of the sectors in its active set and the Walsh codes of its assigned channels. That is, operating under IS-2000, the AT will decode transmissions using all the PN offsets in its active set, together with the respective Walsh codes assigned for each PN-identified sector. The concurrent transmissions in wireless service sectors in the AT's active set provides an added level of reliability to communications, as well as possibly increased quality owing to improved signal to noise characteristics. The concurrency also facilitates a form of seamless handoff between wireless service sectors, referred to as "soft handoff" when the handoff is between sectors of different BTSs, and "softer handoff" when the handoff is between sectors of the same BTS.

In addition to its active set, the AT maintains in its memory a list of "candidate" wireless service sectors (typically up to six), which are those sectors that are not yet in the active set but that have sufficient signal strength that the access terminal could demodulate signals from those sectors. Further, the mobile maintains a list of "neighbor" sectors, which are those sectors not in the active set or candidate set but are in close vicinity to the access terminal. All other possible sectors are members of a "remaining" set.

To facilitate a determination of which sectors should be in the access terminal's active set, all base stations emit a pilot channel signal, typically at a power level higher than other forward link signals. An access terminal then constantly measures the strength of each pilot that it receives and notifies a primary base station (a base station currently serving the access terminal) when pilot strength falls above or below designated thresholds. The base station, in turn, provides the access terminal with an updated list of active pilots.

More particularly, according to the well known EIA/TIA/IS-95 standard or EIA/TIA/IS-2000 standard, the base station initially provides the access terminal with a Handoff Direction Message (HDM), which indicates (i) the PN offsets of the sectors in the active set and (ii) the following handoff parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

Additionally, the base station initially provides the access terminal with a Neighbor List Update Message (NLUM), which identifies the "neighbor" sectors for the current active set.

The access terminal then monitors all of the pilot signals that it receives, and the access terminal determines if any neighbor pilot exceeds T_ADD by T_COMP. If so, the access terminal adds the pilot to its "candidate" set and sends a Pilot Strength Measurement Message (PSMM) to the base station, indicating the estimated $E_c/I_o$ (or some other signal strength measurement, such as signal to interference plus noise ratio (SINR)) for the pilot. Depending on current capacity and other issues, the base station may then send an HDM to the access terminal, listing the pilot as a new member of the active set. Upon receipt of the HDM, the access terminal then adds the pilot to its active set as instructed, and the access terminal sends a Handoff Completion Message (HCM) to the base station, acknowledging the instruction, and providing a list of the pilots (PN offsets) in its active set.

Similarly, if the access terminal detects that the signal strength of a pilot in its active set drops below T_DROP, the access terminal starts a handoff drop timer. If T_TDROP passes, the access terminal then sends a PSMM to the base station, indicating the $E_c/I_o$ (or SINR, for instance) and drop timer. The base station may then respond by sending an HDM to the access terminal, without the pilot in the active set. The access terminal would then receive the HDM and responsively move the pilot to its neighbor set and send an HCM to the base station.

3. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry has introduced a new "high rate packet data (HRPD) system," which is defined by industry standard IS-856.

IS-856 leverages the asymmetric characteristics of most IP traffic, in which the forward link typically carries a higher load than the reverse link. Under IS-856, the forward link uses time division multiplexing (TDM), in order to allocate all power in a sector to a given user at any moment, while the reverse link retains largely the traditional IS-2000 code division multiplexing (CDM) format, albeit with the addition of a "data rate control" (DRC) channel used to indicate the supportable data rate and best serving sector for the forward link. As a result of the full-power allocation by the sector, an access terminal operating under IS-856 can, in theory, receive packet-data at a rate of at least 38.4 kbps and up to 2.4 Mbps.

The IS-856 forward link is divided into time slots of length 2048 chips, and each time slot is further time division multiplexed to carry various channels, including a pilot channel, a Medium Access Control (MAC) channel, and, if any traffic exists, a forward traffic channel and a "control" channel. The pilot and MAC channels are together allocated 224 chips twice per time slot (a total of 448 chips) at pre-assigned positions within each time slot (i.e., at pre-assigned phases of each slot). The remaining chips are allocated for forward traffic ("data chips") or control. As in IS-2000, each wireless service sector in IS-856 is defined by a PN offset, and the pilot channel carries an indication of the sector's PN offset. Also as in IS-2000, an access terminal operating under IS-856 monitors the pilot signal emitted by various sectors as a basis to facilitate active set management, i.e., to facilitate handoff from one sector to another.

IS-856 introduces a "virtual soft handoff" concept, in which an access terminal communicates with the network on just a "best" wireless service sector of its active set at any given time. As in IS-2000, the access terminal monitors the signal strength of pilot signals emitted by various sectors, and the access terminal uses threshold handoff parameters such as those noted above as a basis to trigger the addition of a sector to the access terminal's candidate set. Further as in IS-2000, the access terminal then sends a revised candidate set to the network, and the network decides whether to revise the access terminal's active set. If the network decides to update the access terminal's active set, the network sends an HDM to the access terminal and further instructs each sector to communicate with the access terminal.

Unlike IS-2000 in which forward traffic information is routed to all sectors in the access terminal's active set, forward traffic under IS-856 is routed to only a "best" sector that the access terminal selects from its active set, typically the sector that has the strongest pilot strength. In practice, the access terminal will monitor the pilot signals of the wireless service sectors in its active set, and will include in its DRC (on the reverse link) an indication of the selected serving sector. Unless and until the AT later selects a different wireless service sector, only that sector will then serve the access terminal with forward-link data, transmitting them at full power during time slots allocated for the AT. In turn, the AT will only process and decode transmissions according to the PN offset of its currently-selected wireless service sector and its time slots allocated therein. That is, while other sectors in the AT's active set may also be concurrently transmitting data on their respective forward-link channels, under IS-856, the data will not be intended for the AT, and the AT will not attempt to use the other sectors' PN offsets for decoding. And within its currently-selected sector, the AT will only decode those time slots that are intended for the AT (identified according to a MAC identifier, as described below).

Under IS-856, specific time slots are not pre-assigned or reserved for particular access terminals as part of any type of connection establishment. Rather, the entity controlling the AT's currently-selected wireless service sector (e.g., a BTS, BSC, RNC, or MSC) typically schedules time slot transmissions in near-real-time. The number of time slots allocated to a particular AT during any given time interval may depend on the volume of traffic intended for delivery to the AT, the number of other ATs being served by the sector and their requested data rates, and the data rate requested by the AT according to its most recently-sent DRC message, among other possible factors. The AT determines the proper data rate to request based on its current measurement of SINR (or C/I, for instance), which in turn corresponds to a particular bit rate per data chip that can be supported by the measured signal to noise conditions. A higher value of SINR (or C/I) at any instant accommodates a higher the data rate at that instant.

In practice, an access terminal operating in a wireless communication system network can use stored information to associate measured pilot signal strength and/or SINR with data rate. The AT could maintain the information in memory in the form of a table, for example, which it consults before generating and sending a DRC message. Such a table, incorporating SINR values, could be constructed as follows (Table 1):

TABLE 1

Associating SINR with data rate

| SINR (dB) | Data Rate (kbps) |
|---|---|
| 10.3 | 2,400 |
| 8.0 | 1,800 |
| 3.9 | 1,200 |
| 2.2 | 921 |
| −0.5 | 614 |
| −3.5 | 307 |
| −6.5 | 153 |
| −9.2 | 76 |
| −11.5 | 38 |

By way of example, the values of SINR and associated data rates in Table 1 are adapted from Chapter 4 in "Advances in 3G Enhanced Technologies for Wireless Communications" (note that the original version of this table (Table 4.5 in the cited reference) includes additional gradations of SINR corresponding to different modulation schemes for like data rates; these are omitted here for the sake of brevity). Each value of SINR represents a lower bound (in dB) above which the associated data rate can be supported (and thus requested in a DRC message), and each consecutive pair of SINR values corresponds to a range within which the data rate associated with the lower end of the range may be requested. For instance, a value of SINR between −0.5 dB and 2.2 dB corresponds to a data rate of 614 kbps. As another example, a value of SINR between 8.0 dB and 10.3 dB corresponds to a data rate of 1.8 Mbps, while SINR above 10.3 dB corresponds to a data rate of 2.4 Mbps.

An example of how an AT can select a wireless service sector and data rate may be illustrated by considering an AT with just two sectors, Sector A and Sector B, in its active set. Let the AT measure a pilot strength of −80.0 dBm for Sector A and −80.1 dBm for Sector B. Also, for exemplary purposes, let Sectors A and B be assigned PN offsets 4 and 100, respectively. Further, assume that the AT measures −85 dBm of interference from other sources, including other sectors not in its active set and thermal noise, for instance. Since the AT measures a stronger signal from Sector A, it will select Sector A for service. Taking the measured strengths of Sector A, Sector B, and other interference to be $P_A$, $P_B$, and $P_{other}$, respectively, SINR may then be calculated as $P_A - P_B - 10 \log_{10} [1 + 10^{(P_{other} - P_B)/10}]$ dB. For the exemplary values given above, this formula yields SINR=−1.1 dB (rounded to the nearest tenth). Referring to Table 1, then, the AT would select a data rate of 307 kbps in its DRC message to the controlling entity of Sector A. The above formula can easily be extended to account for additional pilot signals in the AT's active set.

Operation in an IS-856 compliant communication system may be illustrated, again with reference to FIG. 1. To acquire packet data connectivity under IS-856, after an access terminal first detects an IS-856 carrier, the access terminal sends to its BSC (or RNC) 118 a UATI (Universal Access Terminal Identifier) request, and receives in response an UATI, which the access terminal can then use to identify itself in subsequent communications with the BSC. The access terminal then sends a connection-request to the BSC 118, and the BSC responsively invokes a process to authenticate the access terminal and to have the access terminal acquire a data link.

In particular, the BSC 118 sends an access request to an Access Network AAA (ANAAA) server (which may be different than the AAA server 128), and the ANAAA server authenticates the access terminal. The BSC 118 then assigns radio resources for the data session, providing a MAC identifier to the AT for identifying its time-slot data sent in the forward-link traffic channel, and a Walsh code for a sending data on the reverse-link traffic channel. Further, the BSC signals to the PDSN 122 (via PCF 120), and the PDSN and access terminal then negotiate to establish a PPP data link. In addition, as in the IS-2000 process, the access terminal then sends an MIP RRQ to the PDSN, which the PDSN forwards to the HA 130, and the HA assigns a mobile-IP address for the access terminal to use.

As in IS-2000, once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the wireless service sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal to noise ratio, thus facilitating higher rate data communication than the power-limited CDMA channels.

Further, as in IS-2000, if the access terminal does not send or receive data for a defined period of time, the access terminal enters a dormant mode. In the AT's dormant mode, an IS-856 system maintains the logical state of the access terminal's session (e.g., IP address, PPP state, and radio link session information), while releasing the access terminal's radio link resources (e.g., the MAC identifier that had been assigned for use by the access terminal). With the maintained session state, the access terminal can quickly re-acquire a radio link so as to send or receive packet data, thereby giving the appearance that the access terminal is "always on."

4. DYNAMICALLY MERGING WIRELESS SERVICE SECTORS

Under IS-856, an access terminal selects its preferred forward-link wireless sector typically according the strongest pilot signal that the AT detects, as described above. The AT also requests from the BTS that radiates the selected sector (or from a controlling entity, by way of the BTS) a corresponding data rate, determined, in part, from the measured signal. Since an AT's active set is generally comprised of those wireless service sectors with the strongest detected pilot signals, the selected sector will typically be a member of the AT's active set. Note that the strongest pilot signal detected by an AT at any one time is referred to as the "dominant pilot," and will usually also be the strongest of the AT's active set. The wireless service sector corresponding to the dominant pilot is referred to as the "dominant wireless service sector" (or just "dominant sector").

BTSs emit pilot signals in each of their associated wireless service sectors fairly frequently, twice every roughly 1.6 milliseconds (although other emission rates are possible), so an AT may update its current selection for forward-link sector and its requested data rate (as well as its active set) on a correspondingly frequent basis. This rapid updating of wireless service sector selection and data rate request may compensate to some extent for the lack under IS-856 of the soft (and/or softer) handoff that is available under IS-2000 (and facilitated by concurrent transmissions from some or all of the sectors in an AT's active set, as described above). Thus, the ability of the AT to pace its cycle of wireless service sector selection with pilot signal transmissions is part of the basis of the virtual soft handoff mentioned above.

In wireless communication systems, including those compliant with IS-2000 and/or IS-856, any given signal received at an AT from a BTS may traverse multiple paths, owing to reflections of the transmitted signal by physical structures (e.g., buildings) located within the radiation pattern that defines a wireless service sector or other form of coverage zone. For instance, one path may be the line of sight between an AT and a BTS, another may include one reflection, and still another may include two or more reflections. Additional paths and numbers or reflections are possible as well. The length of each path may thus be slightly different, yielding for each a slightly different signal propagation delay between the BTS and the AT. As a consequence, an AT may receive what appear to be multiple transmissions of the same signal, each with a slightly different arrival time, and each containing some fraction of the total power of the emitted signal (it is also possible for two or more different paths to yield signals that arrive at the same time). Depending on the relative strengths and arrival-time offsets of the multiple signals, the net effect can be an increased level of interference, having a negative impact on signal to noise characteristics.

One technique that may be used to mitigate multi-path interference and actually increase the received signal strength by combining the multiple signals is implementation of a "rake receiver" in the AT. A rake receiver comprises multiple sub-receivers, each arranged to carry out reception and decoding operations with a slightly different relative time offset. Each of the sub-receivers is typically referred to as a "finger" of the rake receiver. Employing sub-receiver time offsets similar in magnitude to typical arrival-time offsets between multiple signals, a rake receiver may pick out and decode the multiple signals with one or more of its fingers (e.g., one finger receiving one of each of the multiple signals). All of the decoded signals may then be combined, yielding a sum of their individual received powers and an improved signal to noise ratio.

Note that the process of detecting multiple "copies" of a multi-path signal with a rake receiver and combining them to effectively reconstruct a single, stronger signal is different than the detection of concurrent transmissions of the same signal from different wireless service sectors, as in an IS-2000 compliant system for instance. In the former case, all of the copies of the multi-path signal originate from the same sector, and thus all can be decoded with the same PN offset and (in a CDMA system) same Walsh code. In the latter case, each concurrent signal originates from a different sector, and thus is decoded with a sector-specific PN offset and Walsh code; the AT decodes each signal concurrently as a matter of operation under IS-2000. In fact, any or all of the individual, sector-specific transmissions in an IS-2000 may themselves be subject to rendering as multiple signals (e.g., due to reflections), which are then recoverable with a rake receiver.

In an IS-856 system, or similar system in which an access terminal receives transmissions from only one wireless service sector at any one moment, an AT will nevertheless typically continually monitor the pilot strengths of multiple wireless service sectors, as described above. Because an AT's measurements of the relative pilot strengths of two or more wireless service sectors depend, in part, on its physical location with respect to those sectors, the relative strengths also provide an indication of the degree of overlap at the AT's location of the two or more sectors. More formally, at any moment that an AT measures the strengths of one or more of the non-dominant pilot signals to be within a threshold of its dominant pilot signal, the AT is said to be in a "signal-overlap area" of the corresponding wireless service sectors (including the dominant sector). The amount of power by which a dominant pilot signal exceeds that of a non-dominant pilot signal is referred to as pilot dominance. Pilot dominance may be measured in dB, for example. Another way to describe a signal-overlap area, then, is a region within which pilot dominance with respect to at least one non-dominant pilot signal is less than some threshold value.

Note that a signal-overlap area is a geographical region defined, at least in part, according to the threshold applied to the relative strengths of pilot signals in the region. That is, an AT may move in and out of a given signal-overlap area as it measures the non-dominant pilot signal(s) cross above and below the threshold from the dominant pilot. Further, as an AT moves about within a signal-overlap area, the roles of dominant and non-dominant pilots may interchange with the changing relative position of the AT with respect to the BTS(s) radiating the sectors. However, the threshold defining the relative strengths will generally remain fixed (note, though, that threshold value may be a parameter that is adjustable by the operator of the wireless communication system).

Figure 3:
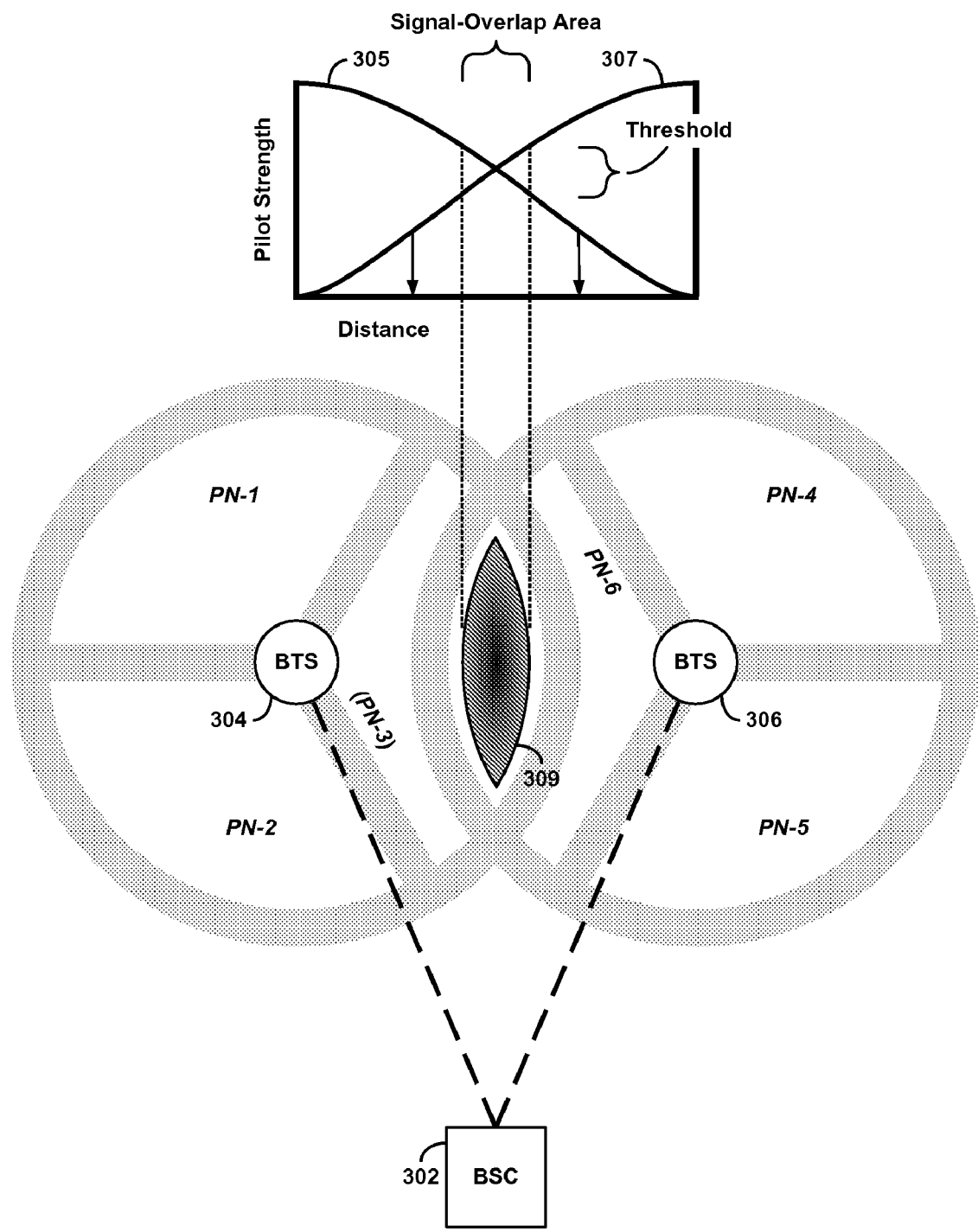
FIG. 3 is a schematic depiction of a signal-overlap areas.

The concept of a signal-overlap area is illustrated in FIG. 3, which includes BTSs 304 and 306, both under the control of BSC 302. By way of example, each BTS radiates three pie-shaped wireless service sectors, each sector being identified by a PN offset. For instance, BTS 304 radiates sectors identified as "PN-1,", "PN-2," and "PN-3." Similarly, BTS 306 radiates sectors identified as "PN-4,", "PN-5," and "PN-6." For the purposes of this discussion, each sector will be referred to by its associated PN offset; e.g., sector PN-1, sector PN-2, etc. In practice, sector boundaries are not sharply defined, but rather correspond to zones within which the signal associated with the radiated pattern drops below some limit of detectability. This is represented in FIG. 3 by the depiction of sector boundaries by broad, gray lines. As illustrated in the figure, the outer limbs of the sectors PN-3 and PN-6 cross each other, defining a region of sector overlap (not necessarily congruous with the signal-overlap area). An AT in the region of sector overlap might detect sufficient signal from each sector to have each included in its active set.

The pilot signal strength of each of the overlapping sectors as a function of distance from the radiating BTS of each sector, measured along a line connecting the two BTSs, is plotted schematically at the top of FIG. 3. In the plot, the pilot strength of sector PN-3 as a function of radial distance from BTS 304 (along a line to BTS 306) is shown by curve 305. As the distance from BTS 304 increases, the signal strength decreases. The arrow directed downward from curve 305 indicates the location of the outer limb of sector PN-3 along the line connecting the two BTSs. Curve 307 similarly indicates the pilot strength of sector PN-6 as a function of radial distance from BTS 306 (along a line to BTS 304), and the downward arrow indicates the location of the outer limb of the sector. Note that there may be non-zero signal strength even beyond the outer limb (downward arrow) of each sector.

At the location where the two curves cross, the measured signal strengths from both sectors are equal. Moving away from the cross-over point, one signal grows in strength while the other decreases; which grows and which decreases depends on the direction taken from the cross-over point, as shown. While this plot corresponds to measured signal strength along the line connecting the two BTSs, a similar plot could be drawn for any location within the region of sector overlap. The signal-overlap area 309 is shown in relation to the sectors as a graduated gray area within the region of sector overlap. As indicated by the pair of vertical dashed lines, the boundaries of signal-overlap area 309 correspond to a region of the plot labeled "Signal-Overlap Area." In the signal-overlap area, the difference between the stronger signal and the weaker signal is within a threshold (labeled as "Threshold" in the plot).

Note that the particular arrangement depicted in FIG. 3 is exemplary and other configurations are possible. For instance, a signal-overlap area may correspond to a region strattling the boundary between two adjacent sectors of a single BTS, or may correspond to a region including all sectors of a single BTS. As a further example, the two BTSs shown in FIG. 3 could each be controlled by a different BSC. In each of these and other possible arrangements, the shapes of the signal-overlap area may also differ from that shown in FIG. 3, but the concept of how a signal-overlap area is defined is the same.

When an AT is in a signal-overlap area, the wireless service sectors that comprise the signal-overlap area will generally be a subset of an AT's active set (though this is not required, and may depend, in part, on the specific wireless protocol and associated procedures, for example). In particular, the threshold used to determine that an AT is in a signal-overlap set may be tighter than that used in determining members of the AT's active set (as described above), although this is not required. That is, the pilot signals measured by an AT in a signal-overlap area may be more similar to each other in strength than are those of the AT's total active set. Consequently, when an AT is in a signal-overlap area, the wireless service sectors comprising the signal-overlap area may all be nearly equally good choices for forward-link transmission to the AT. Yet, under IS-856 (or similar protocol), only one (the dominant sector) will be selected. Moreover, transmissions from those sectors not selected will represent interference with respect to that from the selected wireless service sector.

Referring again to FIG. 3, an AT in the region of sector overlap of sectors PN-3 and PN-6 may include both sectors in its active set, for example. In fact, an AT anywhere in either of the two sectors may detect sufficient signal strength to include both in its active set. As illustrated in FIG. 3, however, the signal-overlap area 309 is physically smaller than either individual sector or the region of sector overlap. That is, for the example shown in FIG. 3, the threshold defined for the signal-overlap area is evidently more stringent that any thresholds used to include both sectors in the AT's active set. The signal strengths of PN-3 and PN-6 are more similar to each other in the signal-overlap area than they are in other locations within either sector (although this is not a requirement of signal-overlap areas).

The present invention leverages the similarity of signal strengths in a signal-overlap area, and advantageously enables more efficient operation of the included wireless service sectors.

According to a preferred embodiment, the wireless service sectors comprising sectors of a signal-overlap area are, under certain conditions detailed below, dynamically merged so as to appear to the AT as a single, dynamically-merged wireless service sector (or just "merged sector"). More specifically, a network entity, such as a BTS, BSC, RNC or MSC, that controls a plurality of wireless services sectors that comprise a signal-overlap area may assign each of the sectors the same PN offset, and further, assign the same transmission schedule in each sector. Thus, one or more time slots destined for delivery to a particular AT operating in a dynamically-merged sector will all be transmitted at the same time and with the same PN offset (and Walsh code) in each individual sector of the merged sector. As a result, the AT will receive and combine the multiple transmissions of each separately-transmitted time slot, advantageously deriving the benefit of increase signal power of the merged sector, as well as the reduced interference from what had been viewed by the AT, prior to the merging, as separate sectors.

Considering again the example of FIG. 3, sectors PN-3 and PN-6 could be merged by BSC 302 by assigning both sectors to PN-6, for instance. This is represented in FIG. 3 by labeling of PN-3 in parentheses (i.e., "(PN-3)") in order to indicate that "PN-3" is no longer used once the merge has made. Thereafter, both sectors would transmit the same signals on the same schedule and same time slots using "6" for the PN offset. Correspondingly, any AT operating anywhere in either of the individual sectors (not just in the signal-overlap area) would receive all time slot data from sector PN-6, transmitted simultaneously by BTS 304 and 306.

Because each of the sectors in a dynamically-merged wireless service sector will use the same PN offset and Walsh code, an AT in the merged sector will detect multiple signals with the same PN offset and Walsh code (at least one from each individual sector comprising the merged sector). As in the case of multi-path signals described above, the AT may use a rake receiver to detect and combine the multiple signals it receives from the plurality of individual sectors comprising the merged sector. Compared with transmissions from any one of the individual sectors, the combined signals that the AT receives and attributes to the same PN offset (i.e., to the merged sector) may represent a significant increase in the total power. For example, if an AT measures the same power from each of two individual sectors of a merged sector, then their combined signal in the merged sector would be twice that of either individual power. Note that the total power may include contributions due to multi-path signals (e.g., due to reflections) from any or all of the individual sectors, as well.

In practice, the pilot signal of each wireless service sector of an IS-856 system is broadcast during the same two phases of each time slot (96 chips per broadcast), each pilot being distinguished by its respective PN offset. In a dynamically-merged wireless service sector, the pilot signal of each of the individual sectors will have the same PN offset, so an AT operating in anywhere in any one of the plurality of individual sectors comprising the merged sector will measure the sum of their pilot strengths at the AT's location, as described above. In particular, an AT in the signal-overlap area of the individual sectors of a dynamically-merged wireless service sector may measure up to N times the strength of dominant pilot of the overlap area, where N is the number of individual sectors in the merged sector. Correspondingly, the AT may determine and request a higher data rate than it could from any of the individual sectors. Thus one benefit to an AT of operating in a dynamically-merged wireless service sector is an increase in the forward-link data rate that it receives from the wireless access network of the wireless communication system.

As an example of the gain in forward-link power and the corresponding increased data rate, consider again an access terminal operating in the vicinity of Sector A and Sector B described above, where both are members of the AT's active set. As in the previous example, let the AT measure a pilot strength of −80.0 dBm for Sector A and −80.1 dBm for Sector B, and again, for exemplary purposes, let Sectors A and B be assigned PN offsets 4 and 100, respectively, and assume that the AT measures −85 dBm of interference from other sources, including other sectors not in its active set and thermal noise. Rather than treating each sector as separate, sectors A and B are merged into a single sector, yielding the sum of their signal strengths (i.e., a total power of ~−77 dBm), and eliminating their mutual interference. Taking the measured strengths of Sector A, Sector B, and other interference to be $P_A$, $P_B$, and $P_{other}$, respectively, SINR in the case of merged sectors may now be calculated as $P_A - P_{other} + 10 \log_{10}[1 + 10^{(P_B - P_A)/10}]$ dB. For the exemplary values given above, this formula yields SINR=8.0 dB (rounded to the nearest tenth). Referring again to Table 1, and assigning the merged sector A's PN offset of 4, the AT would select a data rate of 1.8 Mbps in its DRC message to the controlling entity of Sector A. Thus the gain in data rate is nearly a factor of six over the non-merged example above. As in the previous example, the above formula can easily be extended to account for additional pilot signals in the AT's active set.

Note that an AT operating in a merged sector, but outside of the signal-overlap area may still accrue a benefit of the total signal strength of the plurality of sectors. Alternatively, such an AT operating outside of the signal-overlap area may instead derive the benefit of increased signal strength owing to its proximity to the BTS of one of the individual sectors, and thus rendering less significant any added signal strength from the other sectors in the merged sector.

In further accordance with the preferred embodiment, transmissions from an AT operating in a dynamically-merged wireless service sector will be received by each of the individual sectors on its respective reverse link. That is, the AT will transmit on the reverse link according to a single PN offset and Walsh code, just as it does in the non-merged case. However, unlike the non-merged case wherein only one sector decodes the received transmission, each of the individual sectors in the dynamically-merged wireless service sector will receive and process the reverse-link transmission as if it were the intended receiving sector for the transmission. Depending on the nature of the reverse-link transmission from the AT, each individual sector that receives the transmission may consume the information contained in the transmission, pass the information up to a common controlling entity, or both.

For instance, when an AT operating in dynamically-merged sector transmits a DRC message to its serving sector, all of the individual sectors comprising the merged sector will receive and decode the message, then pass it up to a common controlling entity (such as a BTS, BSC, RNC, or MSC). The common controlling entity may then schedule simultaneous and identical forward-link time-slot transmissions from each sector at the requested data rate. As another example, each individual sector of a dynamically-merged wireless service sector may monitor a reverse-link receive signal strength indicator (RSSI) from the AT in order to help determine the relative location of the AT within the merged sector. The individual sectors will similarly decode other reverse-link transmissions from ATs operating in the dynamically-merged wireless service sector.

The above discussion describes how individual wireless sectors may be dynamically merged so as to cause them to both operate and appear to an AT as a single sector. The dynamical aspect of merging sectors applies, at least in part, to the action of merging being taken in real-time, while communications between access terminals and the wireless communication system are active. This may be viewed in contrast to a static (or near-static) configuration change or maintenance update made to one or more sectors while some or all of the system is taken offline, for example. Operationally, the dynamic aspect of merging sectors involves conditions and triggers that cause the system to invoke the action of merging sectors, as well as those that cause the system to un-merge one or more individual sectors from a previously dynamically-merged wireless service sector. These operational aspects of the invention are discussed in the next section.

5. EXEMPLARY OPERATION OF DYNAMICALLY-MERGED WIRELESS SERVICE SECTORS

Figure 4:
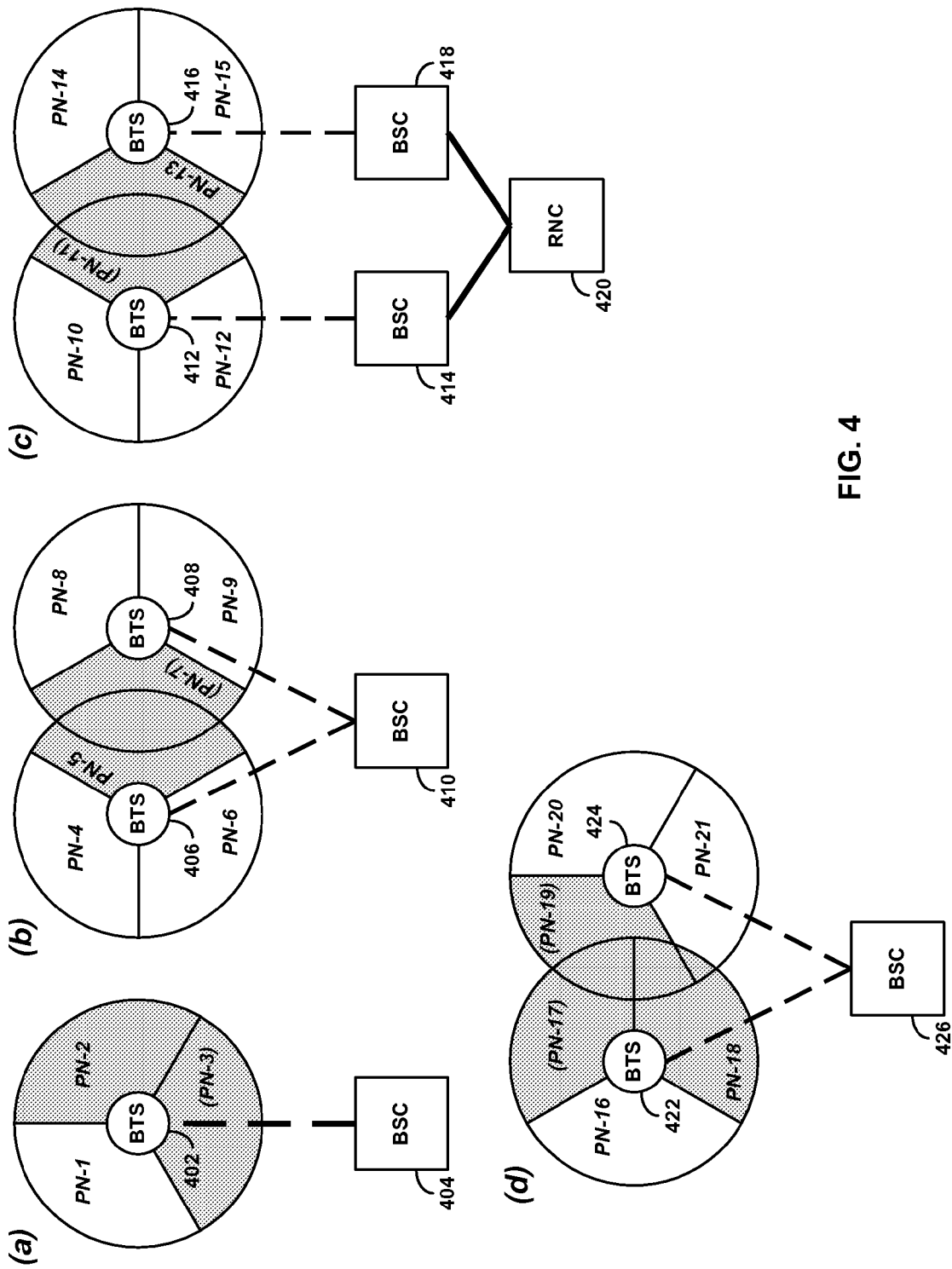
FIG. 4(*a-d*) illustrates four possible configurations of merged wireless service sectors.

Before describing the operational conditions that may cause a system to dynamically merge sectors, it is useful to consider a few exemplary system configurations in order to illustrate the elements and entities involved and how they are inter-related. FIG. 4 depicts four possible arrangements of merged wireless service sectors. In each example, a single controlling entity is responsible for merging and un-merging sectors, as well as scheduling and routing forward-link time-slot data for simultaneous transmission in each sector of the merged sector, as well as other possible control functions. The individual sectors of the merged wireless service sector are shown in gray in each example.

In FIG. 4(a), a single BTS 402 under the control of BSC 404 radiates three sectors, PN-1, PN-2, and PN-3. Sectors PN-2 and PN-3 comprise the individual sectors of a single merged wireless service sector. The labeling of PN-3 in parentheses is meant to indicate that the merged sector is identified as PN-2, and that the PN-3 identifier is not in use as long as the two sectors remain merged. For this exemplary configuration, BSC 404 is responsible for dynamically merging the sectors, scheduling and routing simultaneous and identical forward-link time slot transmissions from the two sectors (PN-2 and PN-3) to ATs operating in the merged sector, and un-merging the two sectors. As described above, the simultaneous and identical forward-link time-slot transmissions from the two sectors to any given AT will both use the same PN offset (PN-2 in this example) and same Walsh code.

FIG. 4(b) shows two BTSs, 406 and 408, both under the control of a single BSC 410. Each BTS radiates three sectors, PN-4, PN-5, and PN-6, and PN-7, PN-8, and PN-9, respectively. In this exemplary configuration, PN-5 and PN-7 (each radiated by a different BTS) are merged, wherein the merged sector is identified as PN-5 (with PN-7 labeled in parentheses). BSC 410 is the controlling entity, functioning in a manner similar to that described for BSC 404 in FIG. 4(a). As above, the simultaneous and identical forward-link time slot transmissions from the two sectors to any given AT will both use the same PN offset (PN-5 in this example) and same Walsh code.

FIG. 4(c) shows BTS 412 under the control of BSC 414, and BTS 416 under the control BSC 418. Each BSC is then under the control of RNC 420. BTSs 412 and 416 each radiate three sectors, PN-10, PN-11, and PN-12, and PN-13, PN-14, and PN-15, respectively. In this exemplary configuration, PN-11 and PN-13 (each radiated by a different BTS) are merged, wherein the merged sector is identified as PN-13 (with PN-11 labeled in parentheses). The controlling entity in this case is RNC 420. Note that RNC 420 could be incorporated in one or the other of the BSCs, in which case the integrated entity could comprise a C-RNC, while the other BSC could comprise a serving RNC. Similarly to the above example, the simultaneous and identical forward-link time slot transmissions from the two sectors to any given AT will both use the same PN offset (PN-13 in this example) and same Walsh code.

In FIG. 4(d), two BTSs, 422 and 424, are depicted, both under the control of a single BSC 426. Each BTS radiates three sectors, PN-16, PN-17, and PN-18, and PN-19, PN-20, and PN-21, respectively. In this exemplary configuration, PN-17, PN-18 and PN-19 are merged, wherein the merged sector is identified as PN-18 (with PN-17 and PN-19 labeled in parentheses). BSC 426 is the controlling entity, scheduling and routing simultaneous and identical forward-link time slot transmissions from all three sectors (PN-17, PN-18 and PN-19) to ATs operating in the merged sector, and un-merging one or more of the individual sectors from the merged sector. In this case, the simultaneous and identical forward-link time slot transmissions from the three sectors to any given AT will all use the same PN offset (PN-18 in this example) and same Walsh code.

Note that the examples shown in FIG. 4 are not intended to be limiting, and other arrangements are be possible as well. These may include, without limitation, sectors radiated by three or more BTSs, BTSs with more or fewer sectors than three, and different controlling entities (e.g., MSCs).

While a merged wireless service sector may yield the benefit of higher forward-link data rates compared with the data rates of individual sectors, the number of distinct time slots available for forward-link data in a merged sector may be reduced with respect to the total number of time slots of all the sectors by a factor equal to the number of individual sectors in the merged sector. That is, the total number of forward-link data time slots available for N individual sectors may be N times the number in each individual sector. However, the number available in a merged sector comprising N individual sectors is just the number of forward-link data time slots of a single wireless service sector. Since each individual sector in a merged sector initially brings to the merged sector a respective volume of forward-link traffic, the benefit of higher forward-link data rates may be offset to some extent by a higher total volume of forward link traffic.

Operationally, the entity that controls a plurality of wireless services may determine whether or not to dynamically merge all or a subset of the plurality based, in part, on the benefits and/or tradeoffs of such a merge to the access terminals operating in any or all of the sectors. For example, the controlling entity may estimate how many ATs would experience increased forward-link data rates, as well as a range of expected increases. This may be compared with the possible reductions in time-slot availability on a per-AT basis, owing to the increased ratio of ATs to available time slots in the merged sector.

The entity may also include consideration of the operational impact on the system that would result from dynamically merging all or a subset of the plurality of sectors. For instance, the controlling entity may determine that the total traffic load that would result from dynamically merging all or a subset of the plurality of sectors is above or below a threshold value, and accordingly make a decision for or against merging.

In a preferred embodiment, an algorithm may be implemented whereby a total traffic load, $r_{total}$, of ATs operating in two or more sectors is determined, wherein the two or more sectors may be controlled by a common controlling entity. The algorithm may also determine the percentage, $x_{s-o}$, of the active ATs operating within a signal-overlap area of the two or more sectors, such that each of these ATs measures a pilot dominance, $\Delta P_{dom}$, that is less than (or, less than or equal to) a specified threshold level, $\Delta P_{thresh}$. If $r_{total}$ is less than (or, less than or equal to) a pre-determined level, $r_{max}$, and $x_{s-o}$ is greater than (or, greater than or equal to) a threshold value, $x_{thresh}$, then the entity controlling the two or more sectors dynamically merges the sectors, creating a dynamically-merged wireless service sector. Note that a given controlling entity may control more individual sectors than are included in the merge sector. Further, the algorithm could specify certain sectors that should not be merged, even if other conditions for merging are met.

In practice, $r_{total}$ could be determined by the controlling entity according to the total number of simultaneous active ATs in the two or more sectors, or according to available resources such as MAC identifiers or channel elements (perhaps in comparison to the total demand), for example. Further, $x_{s-o}$ could be determined by the controlling entity using $\Delta P_{dom}$ (or other information) in reverse-link messages from the ATs, such as PSSMs. For instance, the controlling entity could identify all those ATs operating in a signal-overlap area according to values of $\Delta P_{dom}$ contained in or inferred from their PSSMs.

More specifically, each AT could send to the controlling entity a set of pilot strengths comprising at least one pilot measurement for each sector under the entity's control. The controlling entity could then determine $\Delta P_{dom}$ for each measurement in a given set, and correspondingly determine whether the AT associated with the set is in a signal-overlap area (i.e., by comparing $\Delta P_{dom}$ to $\Delta P_{thresh}$). By repeating this for each AT, the controlling entity could determine the number of ATs in a signal-overlap area, and hence compute $x_{s-o}$. That is, $x_{s-o}$ could be computed as a ratio of the number ATs operating in a signal-overlap area of the two or more sectors to the total number of ATs in the two or more sectors. Alternatively or additionally, $x_{s-o}$ could be computed as a ratio of the total traffic volume attributable to ATs in the signal-overlap area to the total traffic demand of attributable to all ATs in the two or more sectors.

The various forms of algorithm parameters and variables described above are exemplary, and not meant to limit the scope of the present invention. Other forms are possible as well. In addition, any or all of the threshold values $\Delta P_{thresh}$, $x_{thresh}$, and $r_{max}$, may be settable by the operator of the wireless communication system, in order to optimize performance, for instance.

As an example, consider two sectors, A and B, under the control of a single BSC. Further, assume that $r_{total}$ is measured simply as a total number of ATs operating in sectors A and B, and that $x_{s-o}$ is measured as a percentage of $r_{total}$ (i.e., the number of ATs operating in a signal-overlap area of Sectors A and B as a percentage of $r_{total}$). Additionally, assume that $\Delta P_{thresh}$2 dB; i.e., the signal-overlap area for Sectors A and B is defined by the region within which the pilot strengths of Sectors A and B are within 2 dB of each other. Further, let $X_{thresh}$=25% and $r_{max}$=100. With these definitions and values, a few exemplary operational outcomes may be illustrated. It should be understood that the following simple illustrations are not intended to be limiting with respect to the present invention.

Suppose that there are 30 ATs operating in Sector A and 40 in Sector B. Then $r_{total}$=70 which is less than $r_{max}$, so the merging is not ruled out by excessive total loading. Next suppose that a total of 13 ATs measure the pilot strengths of Sectors A and B to be within 2 dB of each other (i.e., there are 13 ATs in the signal-overlap area). Since $^{13}/_{70}$=0.186, then $x_{s-o}$=18.6%, which is less than 25%, so the BSC will not merge Sectors A and B. If, however, at least five additional ATs from enter the signal-overlap area, then $x_{s-o}$ will exceed 25%, and the BSC will then merge Sectors A and B.

As another possible set of conditions, suppose that there are 50 and 60 ATs operating is Sectors A and B, respectively. Then $r_{total}$=110, which exceeds $r_{max}$(=100), so the BSC will not merge the sectors, regardless of the value of $x_{s-o}$. If, on the other hand, the total number of ATs in both sectors drops below 100 and $x_{s\text{-}o}$ remains above 25%, then the BSC will merge the sectors.

This simple example illustrates how the controlling entity might use an algorithm to monitor traffic and load conditions among a plurality of wireless service sectors under its control in order to determine if and when to merge two or more of the sectors. The above example may be easily extended to describe how more than two sectors may be merged. In particular, sectors may be merged, wherein at least one of the sectors is already comprised of a merged of two or more sectors. Such a merged sector may be referred to as a composite sector to distinguish it from any purely individual sector prior to the merge. Note, however, that aside from different terminology, a composite sector is not generally different than any other merged sector.

It will be readily recognized by one of ordinary skill in the art that additional and/or alternative algorithms (or other methodologies) may be employed for the purpose of deciding if and when to merge sectors, any one of which algorithms (or methodologies) could be more or less complicated than the examples presented herein. Furthermore, the present examples should not be viewed as limiting the scope of the present invention.

In further accordance with the preferred embodiment, an algorithm may be implemented whereby a determination may be made to un-merge one or more individual sectors from a previously merged sector. That is, the algorithm may be used to determine if and when one or more conditions exist that trigger a controlling entity to un-merge one or more sectors of a dynamically-merged wireless service sector that is under its control. The basic goal of the algorithm is to determine if and when the conditions that led the controlling entity to merge the sectors have changed such that the controlling entity should now un-merge one or more of the sectors.

The exact form of an un-merging algorithm may depend on the details of the wireless protocol employed. Without loss of generality, an exemplary algorithm is described for an IS-856 compliant system in which the merging capabilities described above have been enabled. An AT operating in a merged sector may not be able to distinguish the pilot signals of the individual sectors of the merged sector, because each sector will use the same PN offset, as described above. Thus, ATs in a merged sector cannot provide $\Delta P_{dom}$ measurements for each individual sector to the controlling entity. However, each AT still transmits a reverse-link RSSI that is received and decoded by each individual sector of the merged sector. In turn, the controlling entity may, for each AT, compare the AT pilot signal strengths received in each individual sector in order to estimate the location of the AT within the merged sector.

More specifically, the un-merging algorithm could, for each AT, record a set of AT pilot strengths determined from the first reverse-link RSSI received by each individual sector of the merged sector following the merge operation. Any AT entering a merged sector from a different sector would similarly have its first set of pilot strengths recorded. Thereafter, the algorithm could, for each AT, periodically record updated sets of AT pilot strength. The algorithm could then use observed changes in AT pilot strengths, on a per-AT basis, in order to track (or at least estimate) location changes of each AT, for example with respect to the signal-overlap area.

The exact method of tracking changes in AT pilot strength on a per-AT basis may take on various forms. As an example, on a per-AT basis, the algorithm could compute the difference, $\delta P_{AT}$, between the maximum and minimum values in each set of pilot strength values. Then by comparing $\delta P_{AT}$ corresponding to each successive transmission of reverse-link RSSI with the first recorded value of $\delta P_{AT}$, or with a threshold, the algorithm could effectively track the AT's location with respect to its location on its first transmission (e.g., when the sectors where just merged).

In particular, the first recorded value of $\delta P_{AT}$ for an AT known to be in the signal-overlap area (e.g., as determined by methods described above) may be used to establish a baseline value indicative of the AT's location in the signal-overlap area. In this sense, $\delta P_{AT}$ may be viewed as providing a measure of signal-overlap area that is approximately complementary to that provided by $\Delta P_{dom}$. That is, while $\Delta P_{dom}$ can be used to map out a signal-overlap area as measured by the AT, an initial value of $\delta P_{AT}$ from an AT known to be in a signal-overlap area provides the algorithm an indication of the approximate maximum range of AT pilot strengths, as measured by the sectors, while the AT is in the signal-overlap area. With this concept, the algorithm may use the condition of $\delta P_{AT}$ exceeding a threshold, $\delta P_{max}$, to determine that the AT has exited the signal-overlap area. Similarly, the algorithm may determine when an AT enters the signal-overlap area by detecting that $\delta P_{AT}$ has dropped below the threshold.

By monitoring $\delta P_{AT}$ for all ATs in a merged sector, the algorithm may determine an average value of $\delta P_{AT}$. Then, if the average exceeds $\delta P_{max}$, the algorithm could cause one or more of the sectors to be un-merged. Alternatively, monitoring of $\delta P_{AT}$ for all the ATs could be used to continuously update the current value of $x_{s\text{-}o}$. In turn, the algorithm may determine if and when (and for how long) the merging condition, that $x_{s\text{-}o}$ exceeds $x_{thresh}$, holds. If $x_{s\text{-}o}$ drops below $x_{thresh}$, the algorithm may then cause one or more sectors to be un-merged from the merged sector, or cause an alert to be issued. Further, the algorithm may use additional information to selectively un-merge sectors, or to simply un-merge all sectors. Other actions are possible as well.

Note that in a merged sector comprised of just two individual sectors, $\delta P_{AT}$ will always correspond to a difference between AT pilot strengths measured by the two sectors. However, in a merged sector comprised of three or more sectors, the minimum and maximum values of AT pilot strength used to compute $\delta P_{AT}$ may be measured by a different pair of sectors for each successively determined value. Additionally, the value of $\delta P_{max}$ may be settable by the operator of the wireless communication system, in order to optimize performance, for instance. Further, the system may use one value for all ATs, or a different value for each AT. Other methods of setting $\delta P_{max}$ are possible as well.

The un-merging algorithm may also track the total traffic load, $r_{total}$, in order to determine if and when (and for how long) it exceeds $r_{max}$. If $r_{total}$ is determined to exceed $r_{max}$, then the algorithm may again take action that causes one or more of the sectors to be un-merged from the merged sector. The algorithm may further combine information about $\delta P_{AT}$, $x_{s\text{-}o}$ and $r_{total}$ to determine that all sectors should be un-merged, or it may selectively un-merge sectors. One skilled in the art will recognize that there could be numerous ways to design and implement the un-merging algorithm, all within the scope of the present invention.

In still further accordance with the preferred embodiment, the algorithms described above, both for merging and un-merging sectors, may be implemented in the controlling entity, thereby causing the controlling entity to carry out relevant merging and un-merging actions and operations described above. For example, the algorithms could be implemented in a BTS, BSC, RNC, or MSC, among other possibilities. Moreover, the algorithms could be implemented as a single, integrated program, or as a distributed program across more than one physical and/or logical elements. Further, the merging algorithm and the un-merging algorithm may be components of a single algorithm for determining if and when to merge and un-merge sectors. Still further, implementation of the algorithms applies to the exemplary forms illustrated above, as well as other simpler or more complicated forms that could be developed and/or designed for the purposes described herein.

Figure 5:
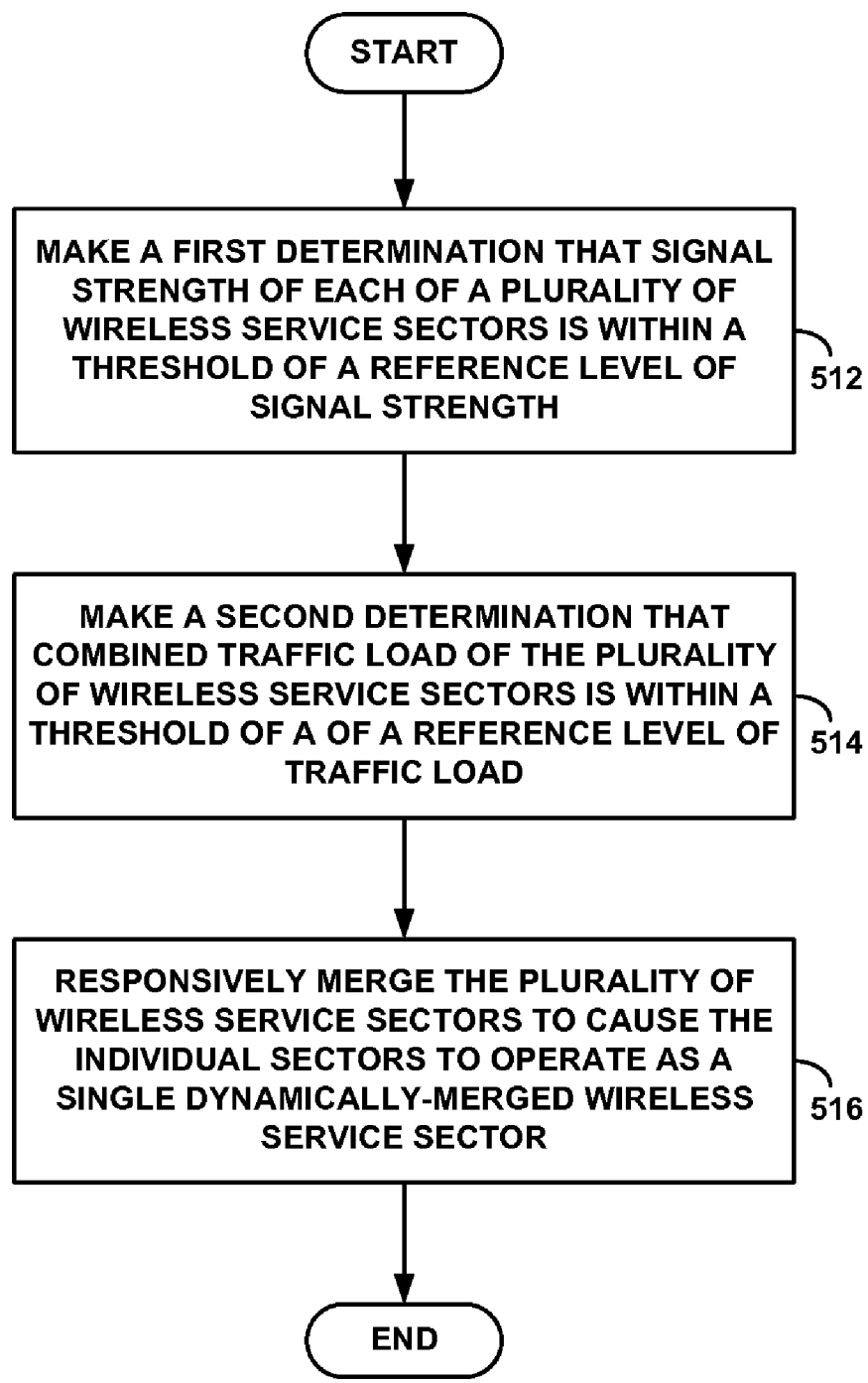
FIG. 5 is a flowchart that illustrates an exemplary embodiment of dynamically merging wireless service sectors.

An exemplary embodiment of dynamically merging wireless service sector is illustrated in the form of a flowchart in FIG. 5. At step 512, a first determination is made that the signal strength of each of a plurality of wireless service sectors is within a threshold of a reference level of signal strength. This step may be viewed as corresponding to determining a signal-overlap area for the plurality of sectors, as described above. Further, it could include conditions as to the number or percentage of ATs that are located in the signal-overlap area.

At step 514, a second determination is made that the combined traffic load of the plurality of wireless service sectors is within a threshold of a reference level of traffic load. This step may correspond to the condition of $r_{total}$ being less than (or, less than or equal to) $r_{max}$, discussed above, for instance.

Finally, at step 516, responsive to the first and second determinations, the plurality of wireless services sectors is merged to create a single, dynamically-merged wireless service sector. As discussed above, each sector in the merged sector is assigned the same PN offset by a controlling network entity, and caused to operate as single sector. Transmissions to each AT operating the merged sector are sent simultaneously from each sector using the common PN offset and a common Walsh code. Thus, each AT may receive the combined forward-link transmission power of all of the sectors in the merged sector, yielding the benefit of a correspondingly-increased data rate.

It should be understood that the steps illustrated in FIG. 5 are exemplary, and that more or fewer and/or different steps may be used which achieve the method described herein, and remain within the scope of the present invention.

Figure 6:
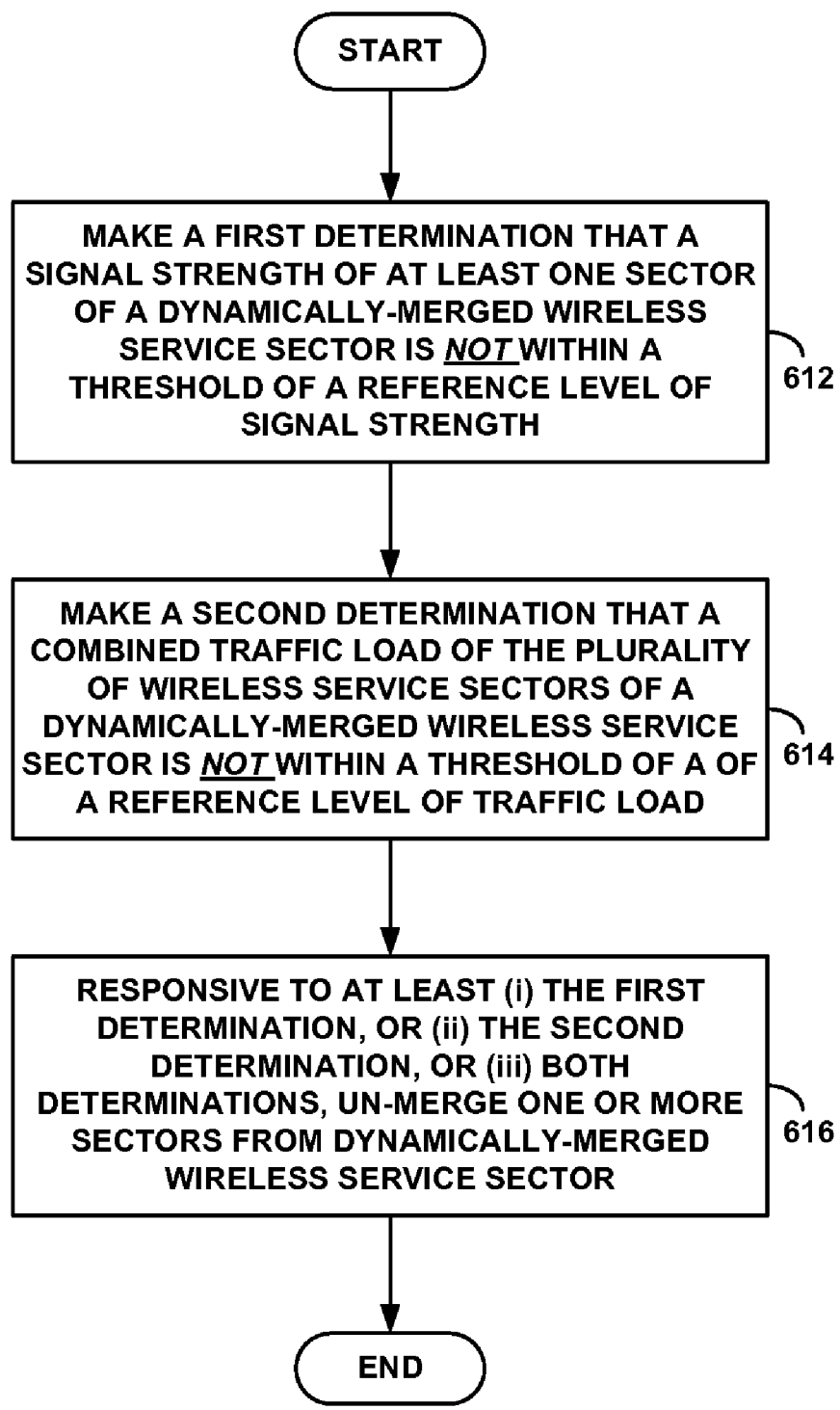
FIG. 6 is a flowchart that illustrates an exemplary embodiment of un-merging at least one sector from a dynamically-merged wireless service sector.

FIG. 6 illustrates an exemplary embodiment of un-merging one or more sectors from a dynamically-merged wireless service sector. At step 612, a first determination is made that the signal strength of at least one sector of a dynamically-merged wireless service sector is not within a threshold of a reference level of signal strength. This step may be viewed as determining that the number of ATs located within a signal-overlap area has dropped below a threshold value, for instance according to an average value of $\delta P_{AT}$, as discussed above.

At step 614, a second determination is made that the combined traffic load of the plurality of wireless service sectors is not within a threshold of a reference level of traffic load. This step may correspond to the condition of $r_{total}$ exceeding $r_{max}$, discussed above, for instance. Finally, at step 616 responsive to at least either or both of the first and second determinations, one or more sectors are un-merged from the merged sector.

As with FIG. 6, it should be understood that the steps illustrated in FIG. 6 are exemplary, and that more or fewer and/or different steps may be used which achieve the method described herein, and remain within the scope of the present invention.

6. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In a wireless communication system comprising a network entity engaging in real-time control of a plurality of wireless service sectors, each defining an air interface for communicating with access terminals, and each having a respective, unique identifier, a method comprising:
    making a first determination that a signal strength of each of the plurality of wireless service sectors is within a threshold of a reference level of signal strength;
    making a second determination that a combined traffic load of the plurality of wireless service sectors is within a threshold of a reference level of traffic load; and
    responsive to at least the first determination and the second determination, the network entity dynamically merging the plurality of wireless service sectors by assigning each of them a single, common identifier and causing them to operate collectively as a single, dynamically-merged wireless service sector with the single, common identifier.

2. The method of claim 1, wherein making the first determination comprises:
    receiving at the network entity from each of one or more access terminals a set of measured signal strengths, each set comprising at least one measurement of signal strength respectively for each wireless service sector of the plurality; and
    the network entity determining for each set that the at least one measured signal strength for each respective wireless service sector is within a threshold of a respective reference level of signal strength.

3. The method of claim 2, wherein the at least one signal strength measured for each respective wireless sector corresponds to a pilot signal strength for each respective wireless service sector, and for each set, the respective reference level of signal strength is a strongest pilot signal in the set.

4. The method of claim 3, wherein each of the one or more access terminals has an active set of wireless service sectors, and wherein each of the one or more access terminal's active set includes at least one of the wireless service sectors of the plurality.

5. The method of claim 1, wherein making the second determination comprises:
    determining a sub-total number of access terminals operating in a signal-overlap area of the plurality of wireless service sectors;
    determining a total number of access terminals operating in at least one of the wireless service sectors of the plurality of wireless service sectors, the total number including the sub-total number;
    determining that the total number is less than a threshold number; and
    determining that a ratio of the sub-total number to the total number is greater than a threshold value.

6. The method of claim 5, wherein determining the sub-total number of access terminals operating in the signal-overlap area of the plurality of wireless service sectors comprises:
    receiving at the network entity from each of one or more access terminals a set of measured pilot signal strengths, each set comprising at least one measurement of pilot signal strength respectively for each wireless service sector of the plurality; and
    the network entity counting among the sub-total number each of the one or more access terminals for which in the corresponding, respective set, the at least one measured pilot signal strength for each respective wireless sector is within a strength threshold of a strongest pilot signal strength in the set.

7. The method of claim 6, wherein each of the threshold number, the threshold value, and the strength threshold comprises an adjustable parameter, its value being settable by an operator of the wireless communication system.

8. The method of claim 1, wherein the respective, unique identifier of each wireless service sector of the plurality is a pseudo-random number (PN) offset, and wherein assigning each of them the single, common identifier comprises assigning each wireless service sector the same PN offset.

9. The method of claim 1, wherein at least one of the wireless service sectors is a composite wireless service sector comprising a two or more merged wireless service sectors, and wherein dynamically merging the plurality of wireless service sectors further comprises dynamically merging the plurality of wireless service sectors with the at least one composite service sector.

10. The method of claim 1, further comprising, after dynamically merging the plurality of wireless service sectors:
determining that the signal strength of at least one of the wireless service sectors is not within the threshold of the reference signal strength; and
the network entity responsively un-merging the at least one wireless service sector from the dynamically-merged wireless service sector.

11. The method of claim 1, further comprising, after dynamically merging the plurality of wireless service sectors:
at each of the plurality of wireless service sectors, respectively measuring a signal strength of each access terminal operating in the dynamically-merged wireless service sector;
determining for each respective access terminal a maximum measured signal strength and a minimum measured signal strength, the determination being made from among the signal strengths measured at each of the plurality of wireless service sectors;
determining for each access terminal a difference between the maximum measured signal strength and the minimum measured signal strength, the difference being a difference value;
computing an average of the difference values of all of the access terminals, the average being an average difference value; and
responsive to a determination that the average difference value exceeds a threshold difference, un-merging at least one wireless service sector from the dynamically-merged wireless service sector.

12. The method of claim 1, further comprising, after dynamically merging the plurality of wireless service sectors:
determining that the combined traffic load of the plurality of wireless service sectors is not within the threshold of the reference level of traffic load; and
the network entity responsively un-merging one or more of the wireless service sectors from the dynamically-merged wireless service sector.

13. The method of claim 1, wherein the network entity is selected from the group consisting of a base transceiver station, a base station controller, a radio network controller, and a mobile switching center.

14. The method of claim 1, wherein at least two of the plurality of wireless service sectors correspond respectively to two radiation patterns emanating from a single base transceiver station.

15. The method of claim 1, wherein at least two of the plurality of wireless service sectors correspond respectively to two radiation patterns emanating from different base transceiver stations.

16. In a wireless communication system comprising a network entity engaging in real-time control of a plurality of wireless service sectors, each defining an air interface according to an air interface protocol for communicating with access terminals, and each having a respective, unique identifier, a method of dynamically merging the plurality of wireless service sectors, the method comprising:
the network entity making a first determination that a number of access terminals operating in a signal-overlap area of the plurality of wireless service sectors is within a first threshold of a first reference number;
the network entity making a second determination that a total number of access terminals operating in at least one of the plurality of wireless service sectors is within a second threshold of a second reference number; and
responsive to at least the first and second determinations, the network entity dynamically merging the plurality of wireless service sectors by assigning each of them a single, common identifier and combining their defined air interfaces for communicating with at least the access terminals operating in the signal-overlap area.

17. The method of claim 16,
wherein the air interface defined by each respective wireless service sector comprises a forward link for transmitting to access terminals operating in the wireless service sector, each forward link having a forward-link transmission power, and
wherein dynamically merging the plurality of wireless service sectors comprises, for at least each access terminal operating in the signal-overlap area, transmitting on all of the forward links concurrently to the at least each access terminal, thereby combining all the forward-link transmission powers to the at least each access terminal.

18. The method of claim 17, wherein a pilot signal is transmitted in each wireless service sector, the method further comprising:
at the network entity, receiving from at least one access terminal a request for a forward-link data rate, the request being based on a combined pilot signal strength of the plurality of wireless service sectors, as measured by the at least one access terminal.

19. The method of claim 18, wherein the air interface protocol comprises IS-856, and receiving from the at least one access terminal a respective request for a forward-link data rate comprises receiving from the at least one access terminal a Data Rate Control message.

20. The method of claim 16, wherein the respective, unique identifier of each wireless service sector of the plurality is a pseudo-random number (PN) offset, and wherein assigning each of them the single, common identifier comprises assigning each wireless service sector the same PN offset.

21. A wireless communication system comprising:
one or more base transceiver stations (BTSs) radiating to define a plurality of wireless service sectors, wherein each wireless service sector defines an air interface according to an air interface protocol for communicating with access terminals, each has a respective, unique identifier, and each wireless service sector has a pilot signal emitted by an associated BTS; and a network entity arranged to control real-time operation of the plurality of wireless service sectors, and further arranged to:
  (i) receive from each of one or more access terminals a set of measured pilot signal strengths, each set comprising at least one measurement of pilot signal strength respectively for each wireless service sector of the plurality;
  (ii) determine a sub-total number of the one or more access terminals for which in the corresponding, respective set, the at least one measured pilot signal strength for each respective wireless sector of the plurality is within a threshold of a strongest pilot signal strength in the set;
  (iii) determine a total number of access terminals operating in at least one of the wireless service sectors of the plurality; and
  (iv) responsive to at least the sub-total number being within a first threshold of a first reference number and the total number being within a second threshold of a second reference number, dynamically merge the plurality of wireless service sectors by assigning each of them a single, common identifier and causing them to operate collectively as a single, dynamically-merged wireless service sector with the single, common identifier.

22. The system of claim 21, wherein the network entity is selected from the group consisting of a BTS, a base station controller, a radio network controller, and a mobile switching center.

23. The system of claim 21,
  wherein the air interface defined by each respective wireless service sector comprises a forward link for transmitting to access terminals operating in the respective wireless service sector, each forward link having a forward-link transmission power, and
  wherein the network entity is arranged to dynamically merge the plurality of wireless services sectors by further causing them, for at least each of the sub-total number of the one or more access terminals, to transmit to each of the one or more access terminals on all of the forward links concurrently, and to thereby combine all the forward-link transmission powers to the each of the one or more access terminals.

24. The system of claim 23, wherein the respective, unique identifier of each wireless sector is a pseudo-random number (PN) offset, and wherein assigning each of them a single, common identifier comprises assigning the same PN offset to each wireless service sector.

25. The system of claim 24, wherein the network entity is further arranged to receive a request message from at least one access terminal for a forward-link data rate, the forward-link data rate being based on a combined pilot signal strength of the dynamically-merged wireless service sector, as measured by the at least one access terminal.

26. The system of claim 25, wherein the air interface protocol comprises IS-856, and the request message comprises a Data Rate Control message.

* * * * *